US00RE37583E

(19) United States
(12) Reissued Patent
Mayer et al.

(10) Patent Number: US RE37,583 E
(45) Date of Reissued Patent: Mar. 19, 2002

(54) PRECISION DIRECT DRIVE MECHANISM FOR A POWER ASSIST APPARATUS FOR A BICYCLE

(75) Inventors: Richard A. Mayer, Saugus; Malcolm R. Currie, Agoura Hills, both of CA (US)

(73) Assignee: Currie Technologies, Incorporated, Van Nuys, CA (US)

(21) Appl. No.: 09/761,078

(22) Filed: Jan. 17, 2001

Related U.S. Patent Documents

Reissue of:
(64) Patent No.: 5,934,401
Issued: Aug. 10, 1999
Appl. No.: 08/803,067
Filed: Feb. 20, 1997

(51) Int. Cl.[7] ..... B62D 61/02
(52) U.S. Cl. ..... 180/220; 180/205
(58) Field of Search ..... 180/220, 205, 180/206, 207, 65.5, 228, 11, 65.1

(56) References Cited

U.S. PATENT DOCUMENTS

| | | | | | |
|---|---|---|---|---|---|
| 1,985,895 | A | * | 1/1935 | Hult | |
| 2,575,873 | A | * | 11/1951 | Henney | |
| 2,586,702 | A | * | 2/1952 | Obram | |
| 3,747,721 | A | * | 7/1973 | Hoff | |
| 3,884,317 | A | * | 5/1975 | Kinzel | |
| 3,912,039 | A | * | 10/1975 | Ordemann | |
| 3,921,741 | A | * | 11/1975 | Garfinkle et al. | |
| 3,921,745 | A | * | 11/1975 | McCulloch et al. | 180/205 |
| 4,346,777 | A | * | 8/1982 | Restelli et al. | 180/220 |
| 4,410,060 | A | * | 10/1983 | Cunard | 180/205 |
| 4,494,623 | A | * | 1/1985 | Kurata et al. | 180/230 |
| 4,721,177 | A | * | 1/1988 | Qizhen | 180/205 |
| 5,242,028 | A | * | 9/1993 | Murphy et al. | 180/220 |
| 5,272,938 | A | * | 12/1993 | Hsu et al. | 74/594.1 |
| 5,341,892 | A | * | 8/1994 | Hirose et al. | 180/220 |
| 5,368,122 | A | * | 11/1994 | Chou | 180/220 |
| 5,375,676 | A | * | 12/1994 | Takata et al. | 180/206 |
| 5,433,284 | A | * | 7/1995 | Chou | 180/205 |
| 5,450,915 | A | * | 9/1995 | Li | 180/65.5 |
| 5,474,148 | A | * | 12/1995 | Takata | 180/206 |
| 5,474,150 | A | * | 12/1995 | Mabuchi | 180/220 |
| 5,487,442 | A | * | 1/1996 | Hua et al. | 180/220 |
| 5,489,002 | A | * | 2/1996 | Streiff | 180/65.3 |
| 5,505,277 | A | * | 4/1996 | Suganuma et al. | 180/206 |
| 5,524,726 | A | * | 6/1996 | Wright, Jr. | 180/220 |
| 5,755,304 | A | * | 5/1998 | Trigg et al. | 180/65.5 |

FOREIGN PATENT DOCUMENTS

| | | | |
|---|---|---|---|
| WO | 93/11992 | * | 6/1993 |

* cited by examiner

*Primary Examiner*—Avraham H. Lerner
(74) *Attorney, Agent, or Firm*—Jack C. Munro

(57) ABSTRACT

A power assist apparatus which includes a battery pack that connects with a motor housing with the battery pack being removably mounted on the frame of the bicycle and the motor housing being mounting on a mounting plate which is carried by one of the support wheels of the bicycle. The power assist apparatus is designed to not only assist in the manual operation of the bicycle but also as a sole source of power for the bicycle. The mounting plate is to be affixed to the frame of the bicycle upon the desired location being selected for the mounting plate. The motor assembly operates a drive gear, pulley or sprocket which connects to a driven gear, pulley or sprocket which is mounted in conjunction with one of the support wheels of the bicycle. The motor housing may be disconnectable from the mounting plate as also the battery pack is capable of being disengaged from the frame of the bicycle permitting the bicycle to be used as a conventional bicycle without the power assist apparatus. The motor assembly is indexed to the axle of the support wheel maintaining accurate alignment in all operating conditions and upon repeated engagements and disengagements of the support wheel from the bicycle frame.

14 Claims, 6 Drawing Sheets

120
124
128
130
126

14
106
32
104
34
110
118
24
102
68
62
116
54
56
82
46
64
38
50
84
66
40
88
92
64
42
66
122
124
108
110
120
130
128
126
8
8
104

PRECISION DIRECT DRIVE MECHANISM FOR A POWER ASSIST APPARATUS FOR A BICYCLE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an electrically operated, by means of a battery, power assist apparatus for a bicycle and more particularly, to a new and novel construction of that power assist apparatus for a bicycle.

2. Description of the Prior Art

Electric powered bicycle have long been known. All electric powered bicycles incorporate an electric motor which is powered by a battery. One way the bicycle is powered is by a motor that operates through a drive wheel which frictionally engages with a support wheel of the bicycle. Movement of the drive wheel adds power to the manual movement of the bicycle or could be the only source of movement of the bicycle. Frictional engagement between the drive wheel and a support wheel is only one method. Others involve many configurations of direct drive involving shafts, chains, and gears but with the common feature of the driving motor being mounted on the bicycle frame in one position or another (e.g., near the pedaling sprocket, on one of the stays or on a rack above the rear support wheel).

The prior art direct drive power assist devices for a bicycle have generally required complex gearing arrangements. Upon removal of the wheel for maintenance, such as tire repair, precise reengagement is difficult leading to excessive wear and noise during operation. Also, complex gearing arrangements are difficult to maintain in precise alignment when the bicycle encounters road bumps and holes. Also, incorporation of prior art power assist apparatuses on bicycles has made it difficult to remove and replace the wheel(s) of the bicycle for tire repair and/or replacement. Additionally, if it is desired to use the bicycle as a normal bicycle and have the bicycle not carry the extra weight of a battery pack plus a motor assembly, the prior art direct drive power assist apparatuses for bicycles have not been designed to be readily removable from the bicycle to permit normal manual usage without the extra weight involved.

In prior art direct drive systems, the motor is mounted on the bicycle frame. Therefore, when the wheel is removed and replaced on the frame, such as required in order to change a tire or to do other types of maintenance, slight variations prevent precise realignment between the drive gear of the motor and the drive gear mounted on the wheel. These slight variations often result in excessive noise and wear.

SUMMARY OF THE INVENTION

The subject invention is a power assist apparatus for a bicycle which utilizes a direct drive mechanism between an electric motor and a drive gear, pulley or sprocket mounted on the hub of one of the wheels of the bicycle. It has been found to be most desirable to have the axis of the rotatable shaft of the motor parallel to the rotational shaft of a wheel for reasons of simplicity and smoothness of operation. A one-way clutching mechanism is to be mounted between the wheel and the motor. One or more batteries mounted within a battery pack are to be used to power the motor with this battery pack to be removably mounted on the frame of the bicycle. The motor is mounted within a motor housing with the motor housing being mounted within an enlarged hole formed within a mounting plate. The mounting plate is to be carried by a support wheel of the bicycle with either support wheel being satisfactory. This mounting plate is to be affixed by a bolt fastener (or pin) to the frame of the bicycle. This bolt or pin is to be easily removable. The mounting plate can be attached at any desired angular position on the support wheel but when selected is then fixed. The motor housing may be removably mounted on the mounting plate by a series of locking tabs being utilized to facilitate the engagement and disengagement of the motor housing to that mounting plate.

The primary objective of the present invention is to provide a vehicle of transportation for work and recreation that can be used by most people without adding to the smog caused by combustion engines, especially in urban areas.

Another primary objective of the present invention is to obtain a self-contained drive train support wheel configuration which, at all times, retains precision alignment between the gear attached to the drive motor and the driving gear attached to the axle of the bicycle. This is critical both for removal of the support wheel for repair and reengagement with bicycle frame to prevent any slight misalignments which cause excessive gear wear and noise.

A further objective of the present invention is to construct a power assist apparatus for a bicycle which is composed of few parts, is of lightweight construction, is efficient, is durable and requires a minimum of maintenance, and still can be manufactured economically.

Another objective of the present invention is to construct a smoothly operating, substantially vibration free, direct drive, power assist apparatus for a bicycle.

Another objective of the present invention is to construct a power assist apparatus for a bicycle which does not interfere with the maneuverability of the support wheel on which it is mounted in order to permit normal tire repair and replacement.

Another objective of the present invention is to construct a power assist apparatus which can be readily removed from the bicycle so that the bicycle can be manually operated in a normal manner when so desired without carrying the extra weight of the power assist apparatus.

Another objective of the present invention is to construct a power assist apparatus which is reengaged with precision indexed alignment between the gears when the support wheel is remounted on the bicycle.

A further objective of this invention is to obtain a practical direct drive gear system employing precision indexing and alignment which is in a self-contained bicycle rear wheel assembly that features: (1) precision alignment with repeated removal and reengagement of rear wheel for repair; (2) maintaining precision alignment in all rough environments; and (3) has fast conversion of non-electric to electric configuration (<3 minutes) and back again with minimal weight penalty in normal operation.

A further objective of the present invention is that the bicycle can be used interchangeably with a regular support wheel or a "power wheel." The power wheel contains the motor and the gear assembly whereas the regular wheel would be void of both the motor and the gear assembly. When the bicycle is used with the regular wheel, a common type of manually operated bicycle is obtained. When the bicycle is used with the power wheel, the power assist apparatus of the present invention is used to assist in powering of that bicycle.

DETAILED DESCRIPTION OF THE PREFERRED EMBODIMENT

Figure 1:
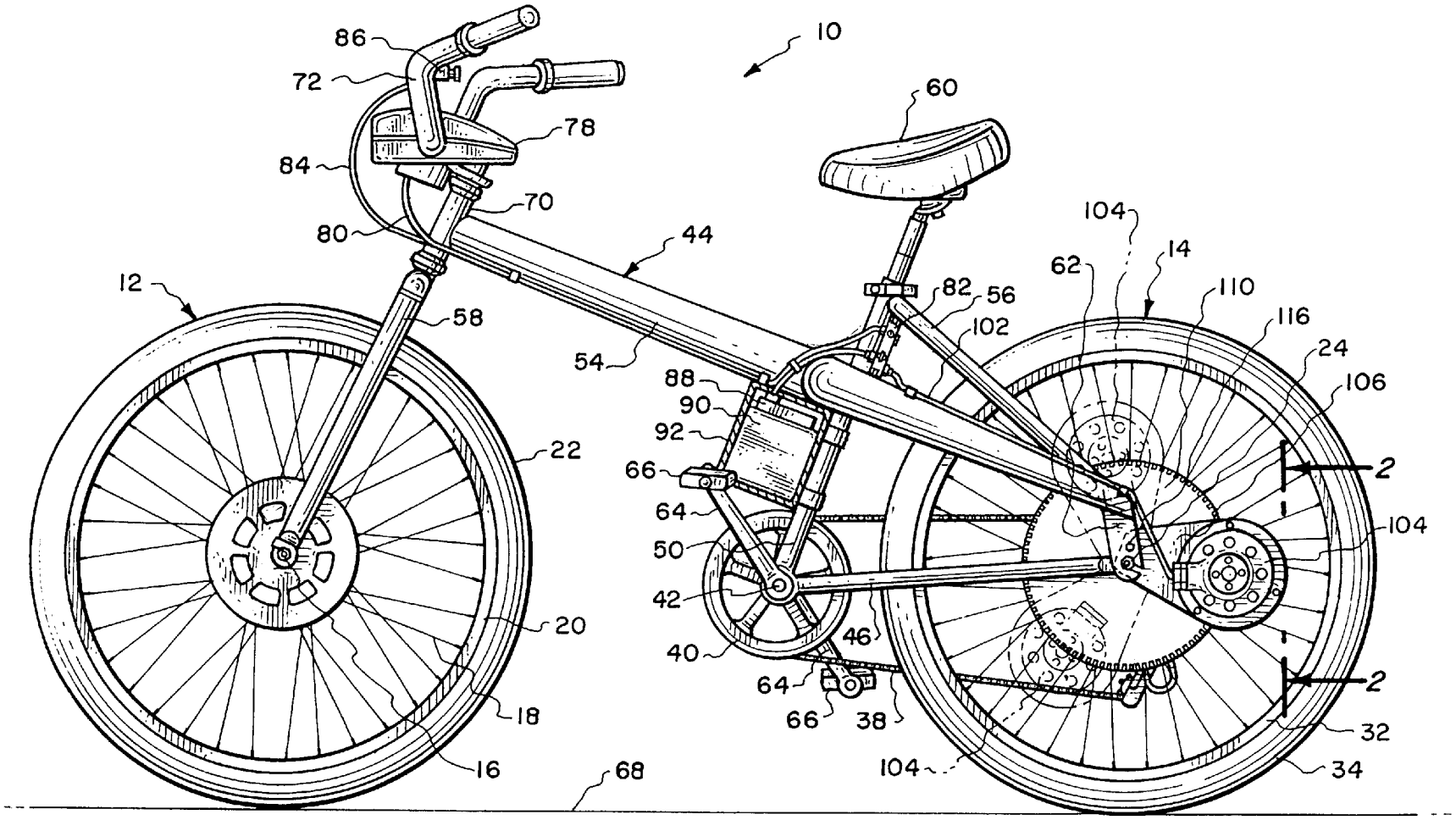
FIG. 1 is a side elevational view of one type of bicycle upon which has been mounted the power assist apparatus of the present invention with it being understood that the power assist apparatus can be easily fitted to virtually any type of bicycle frame.
Figure 3:
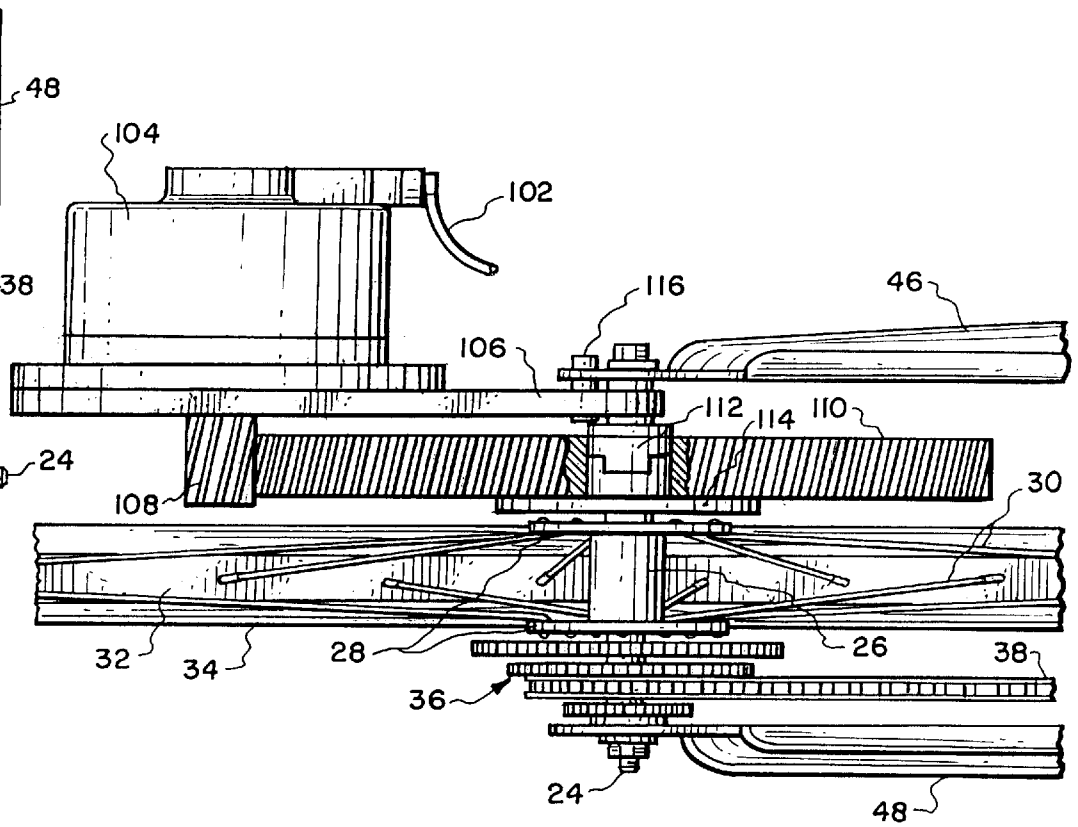
FIG. 3 is a top view of the power assist apparatus taken along line 3—3 of FIG. 2.
Figure 2:
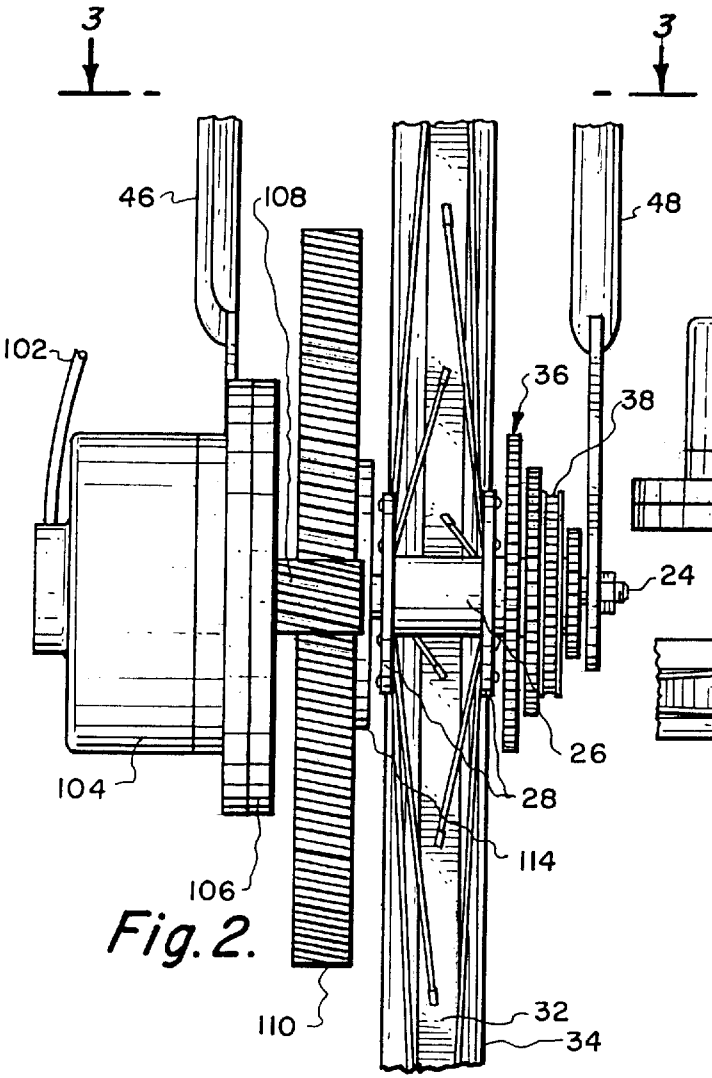
FIG. 2 is a rear view of the power assist apparatus which has been mounted on the rear wheel of the bicycle taken along line 2—2 of FIG. 1.

This invention is described in relation to a bicycle. However, it is understood that this invention could be used not only on a bicycle type vehicle that has two support wheels but also a bicycle type vehicle that has three or four support wheels. The word bicycle will be understood to include all such vehicles. The power assist apparatus could utilize an exterior gear connection, which is shown in the drawings, or could utilize an internal gearing arrangement mounted within the hub of the support wheel on which the motor of the power assist apparatus is mounted. Also, instead of gears, a chain or belt drive could be used.

Referring particularly to the drawings, there is shown a bicycle 10 having a front wheel 12 and a rear wheel 14. The rear wheel 14 is rotatable solely within a plane of rotation. The front wheel 12 includes an axle 16 from which extends a plurality of wire spokes 18. The wire spokes 18 are affixed to a tire rim 20 on which is mounted a rubber tire 22. In a similar manner, the rear wheel 14 has an axle 24 which is mounted within an axle sleeve 26. Affixed to each end of the axle sleeve 26 is a mounting disc 28 with it being understood that there are two in number of the mounting discs 28. The inner end of wire spokes 30 are attached to the mounting discs 28 with the outer end of the wire spokes 30 being fixedly secured within a tire rim 32. Mounted on the tire rim 32 is a rubber tire 34. Mounted on one end of the axle 24 is a derailleur 36. The derailleur 36 forms no specific part of this invention as it is deemed to be conventional. The derailleur 36 connects to a drive chain 38. The drive chain 38 connects the derailleur 36 to a chain wheel 40. The chain wheel 40 is rotatable mounted by axle 42 to the frame 44 on the bicycle. The frame 44 is composed of chain stays 46 and 48, seat tube 50, main frame member 54, seat stay 56 and front fork 58. The front fork 58 is used to mount the front wheel 12 onto the main frame member 54. The bicycle seat 60 is mounted on the seat tube 50 with the seat stay 56 being connected between the seat tube 50 and the bracket 62 which mounts the main frame member 54 to the rear axle 24. The chain stay 46 connects between the sleeve (not shown) through which is mounted the axle 42 to the bracket 62. Mounted in conjunction with the axle 42 is a pair of cranks 64 which extends in directions opposite to the axle 42. Mounted on the outer end of each crank 64 is a pedal 66. Normal conventional movement of the bicycle 10 is accomplished by manually rotating the cranks 64 about the axle 42 which causes rotation of the derailleur 36 through the drive chain 38. Rotation of the derailleur 36 will result in rotation of the rear wheel 14 which results in movement of the bicycle 10 on the supporting surface 68.

The front fork 58 is mounted on a head tube 70 which is part of the frame 44. Also mounted on the head tube 70 is a handlebar 72. Mounted on the handlebar 72 is an electrical control unit 78. The electrical control unit 78 is to be operated by the human riding the bicycle 10. The electrical control unit 78 is to be mounted on the handlebar 72.

An electrical wire 80 extends from the electrical control unit 78 to a junction connector 82. A throttle wire 84 also extends from throttle 86 to the junction connector 82. The throttle 86 is to be manually moved to various positions to increase or decrease the speed of the power assist apparatus of this invention which is to be described further on in this specification. Also connected with the junction connector 82 is a battery wire 88. The battery wire 88 connects with battery 90 which is mounted within a battery case 92. Battery 90 may comprise a plurality of separate batteries connected electrically in a series. The battery case 92 is to be removably mounted by means of straps 94 and 96 onto straps 98 and 100 which are fixedly secured to the seat tube 50. Any other type of quick disconnect system could be used for the battery case 92. It is to be understood that the battery case 92 can be removed from the seat tube 50 by disconnecting the straps 94 and 96 from the straps 98 and 100 for the purpose of lightening the weight of the bicycle 10 when it is desired to use the bicycle 10 as a conventional bicycle and not utilize the power assist apparatus of this invention which will be described further on in this specification.

Also connected with the junction connector 82 is a motor wire 102. The motor wire 102 supplies electrical power from the battery 90 to the motor (not shown) mounted within motor housing 104. The motor housing 104 in FIGS. 1–4 of the drawings is fixedly mounted onto a mounting plate 106. The motor causes rotation of a drive pinion gear 108. The drive pinion gear 108 is to be in continuous contact with driven gear 110. The driven gear 110 is to be rotated in a rotational plane which is parallel to the plane of rotation of the rear wheel 14. The driven gear 110 is mounted by a clutch 112 to a clutch plate 114. Clutch 112 is concentric with the rear wheel 14. The clutch plate 114 is fixedly mounted onto the axle 24. The clutch 112 is to connect together in rotative movement the driven gear 110 and the rear wheel 114 when the driven gear 110 is being rotated at the same speed (rpm) as the rear wheel 14. However, when the rotation of the rear wheel 14 is at a greater rpm than the driven gear 110, the clutch 112 will permit the rear wheel 14 to rotate freely relative to the driven gear 110. This type of clutch 112 is desired so that the wheel 114 can freely rotate as when the bicycle goes down hills and it is not necessary to have the motor contained within the motor housing 104 engaged for operation. It is important to note that the axis of rotation of drive pinion gear 108 is always parallel to the axis of rotation of axle 24. This indexing of the motor to the axle 24 is absolutely necessary to have the drive arrangement be as noise free as possible and as wear free as possible.

The mounting plate 106 is mounted on the axle 24. There is a bearing (not shown) between the axle 24 and the mounting plate 106 which permits the axle 24 to rotate freely relative to the mounting plate 106. It is to be noted that initially during mounting of the motor housing 104 on the axle 24 that any desired angular position of the mounting plate 106 could be selected relative to the axle 24. This is desired so that the mounting plate 106 can be selected for the particular bicycle 10 so as to not interfere with any other structural component of the bicycle 10. Once the particular desired angular selection is made, it is important that a fastener 116 such as a bolt or pin be mounted between a portion of the frame 44, such as chain stay 46, and hole 118 formed within the mounting plate 106. This fastener 116 now fixed in position the mounting plate 106 relative to the frame 44 of the bicycle 10. This fastener 116 permits the transfer of torque from the motor contained in the motor housing 104 to the rear wheel 14 and is capable of producing rotational movement of the rear wheel 14. The fastener 116 is to be removable.

Figures 4, 7, 8:
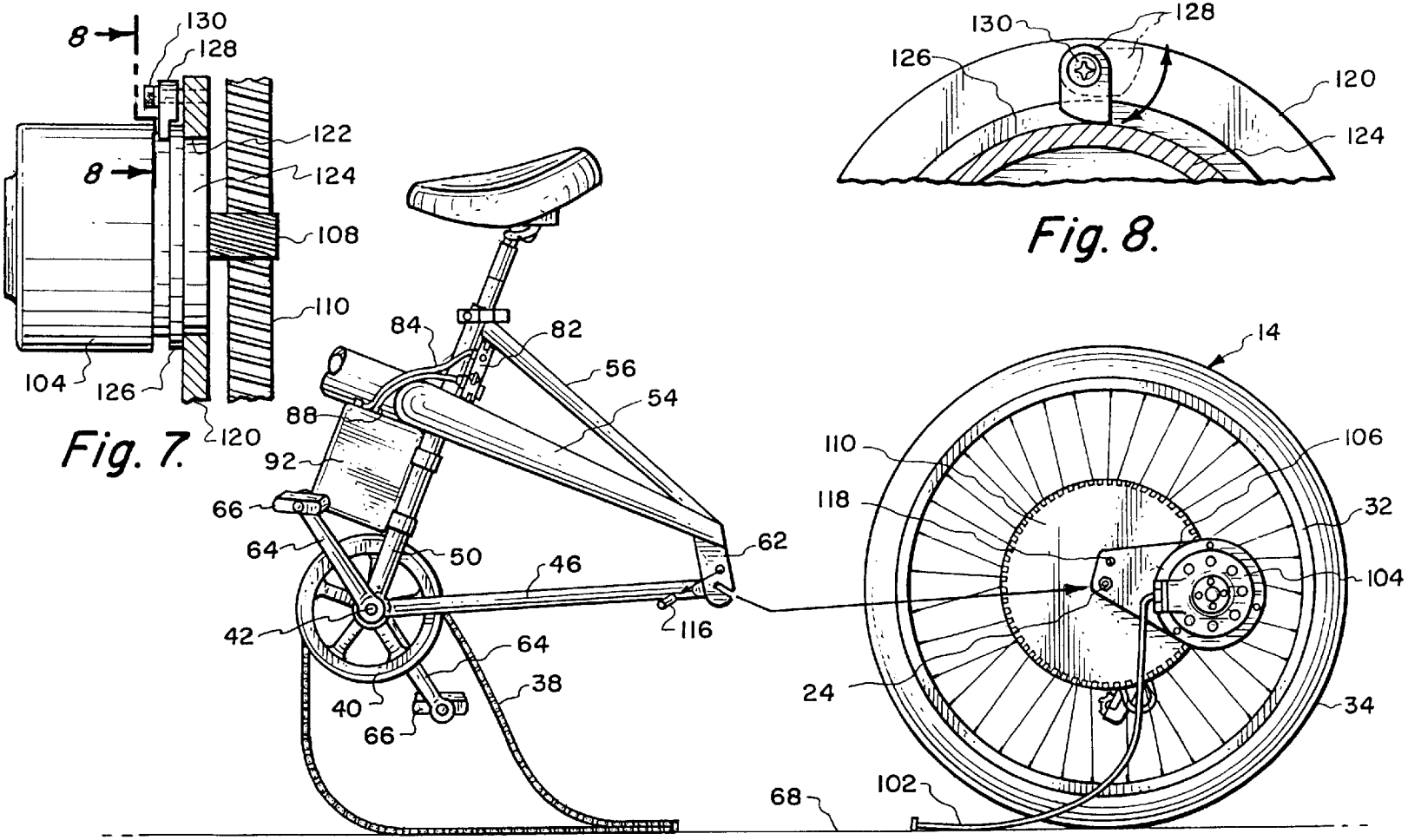
FIG. 4 is a side elevational view of the present invention showing the disconnection of the support wheel from the bicycle where the support wheel has mounted thereon a motor assembly.
FIG. 7 is a cross-sectional view of the present invention through the motor housing mounting taken along line 7—7 of FIG. 5.
FIG. 8 is an enlarged front view of the present invention of a locking tab which is utilized to lock in position the motor housing in conjunction with the mounting plate.

An important consideration of the present invention, which is clearly shown in FIG. 4, is that when the fastener 116 is removed and the wire 102 is disengaged from the junction connector 82, the entire rear wheel 14 can then be separated from bracket 62 which will then permit maintenance to be performed on the rear wheel 14 such as replacement of the rubber tire 34. It is to be noted that the junction box 82, shown mounted on the seat tube 50, could be mounted at any desired location with another preferable location possibly being on the outer surface of the battery case 92.

The size of the motor (not shown) located within the motor housing 104 will typically be about three and one-half inches in diameter with a length of between two to five inches depending on the power desired. The driven gear 110 till typically have a diameter of about seven inches. The drive pinion gear 108 has a diameter of about three-quarters of an inch for a gear ratio of 9.3 to 1. If the rear wheel 14 is twenty-six inches in diameter, the revolutions per minute (rpm) of the motor would be about eighteen hundred at fifteen miles per hour. The motor is to be designed to achieve optimum efficiency in the twelve to eighteen hundred rpm range. It is to be understood that the power assist apparatus is independent of the derailleur 36.

Figure 5:
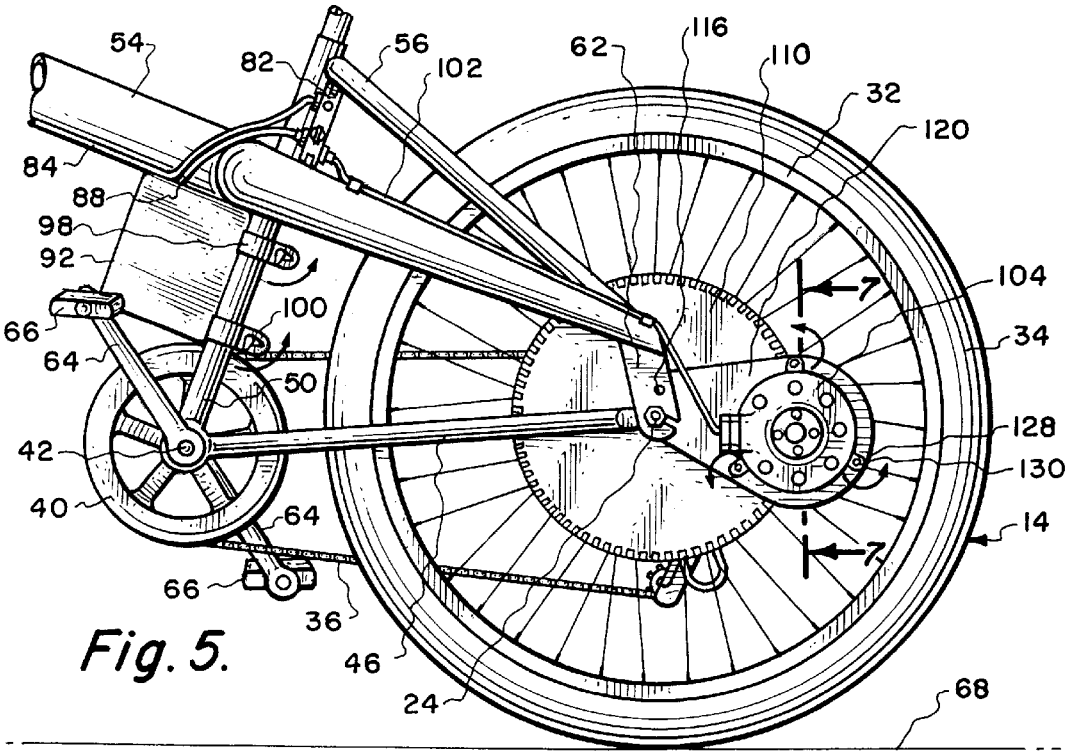
FIG. 5 is a side elevational view of the power assist apparatus of the present invention where the motor housing of the motor assembly is disengageable from the mounting plate, whereas within FIGS. 1–4 the motor housing is fixed to the mounting plate.
Figure 6:
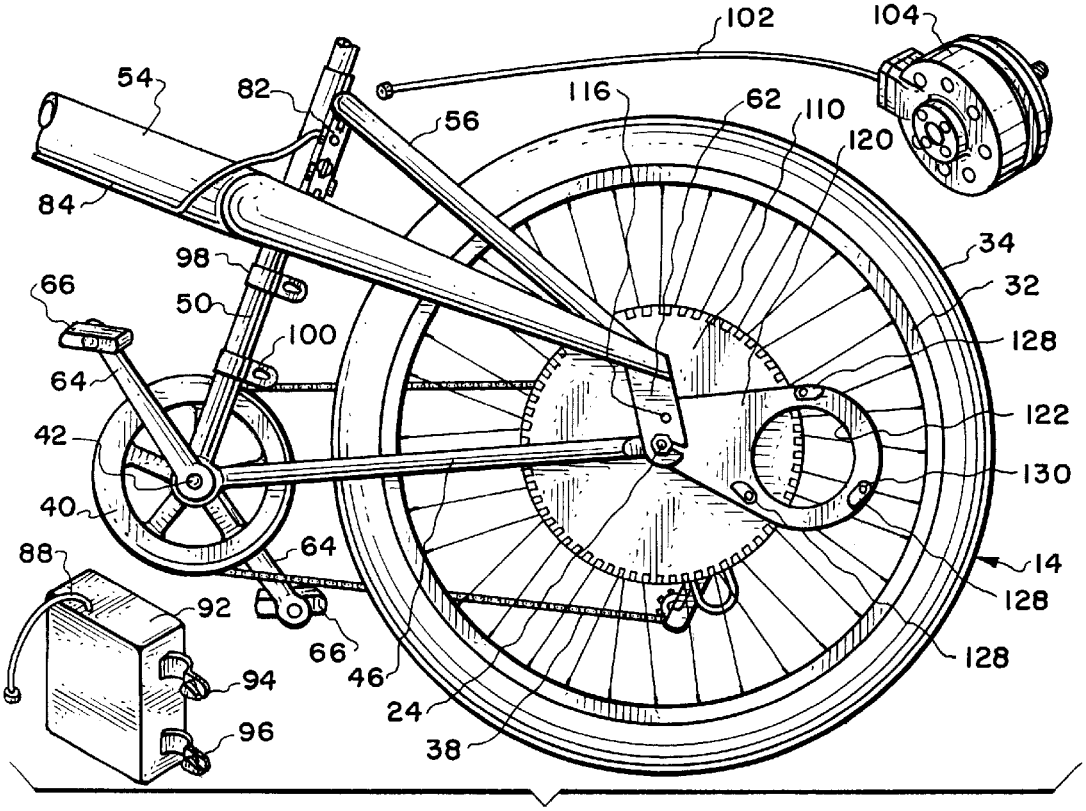
FIG. 6 is an exploded side elevational view of the present invention showing the battery pack and the motor housing disengaged from the bicycle.

Referring particularly to FIGS. 5–8 of the drawings, there is shown a modified form of mounting for the motor housing 104. Instead of the motor housing 104 being fixedly mounted onto the mounting plate, a modified form of mounting plate 120 is utilized which includes enlarged hole 122. The housing 104 includes annular extension 124. The annular extension 124 is to fit in a close fitting relationship within the enlarged hole 122. Extending outward from the annular extension 124 in between the outer edge of the annular extension 124 and the motor housing 104 is an annular ridge 126. The annular ridge 126 is to abut against the mounting plate 120. Mounted on the mounting plate 120 are three in number of locking tabs 128. The locking tabs 128 are angularly spaced about the enlarged hole 122. Each locking tab is mounted by means of a bolt fastener 130. The bolt fastener 130 can be loosened and the locking tab moved from an engaged position with the annular ridge 126, as shown in FIGS. 5 and 7 and also in the solid line position shown in FIG. 8, to a disengaged position which is shown in dotted lines in FIG. 8. The disengaged position spaces the locking tab 128 from the annular ridge 126. It is to be understood that by tightening the bolt fasteners 130 the locking tabs 128 can securely to clamp the annular ridge 126 to the mounting plate 120. Loosening of the bolt fasteners 130 will permit the locking tabs 128 to be pivoted to a displaced position from the annular ridge 126 which will then permit the motor housing 104 to be removed from the enlarged hole 122. At that particular time, the wire 104 disengages from the junction connector 82. The user will then be able to quickly and conveniently disengage the motor and the motor housing 104 and the battery 90 and the battery case 92 from the bicycle 10 which will then permit the bicycle 10 to be used as a conventional bicycle not bearing the extra weight of the battery 90 and battery case 92 and the motor and motor housing 104. Each time when the motor housing 104 is removed from the mounting plate 120 and then replaced in conjunction with the mounting plate 120, the rotational axis of the drive pinion gear 108 will again be located precisely parallel to the rotational axis of the axle 24. This is important to always have the drive pinion gear 108 indexed in this position relative to the axle 24. In other words, disengaging of the motor housing 104 from the mounting plate 120 and then reengaging of same to the mounting plate 120 insures that this indexing relationship is reestablished with precision.

Figure 9:
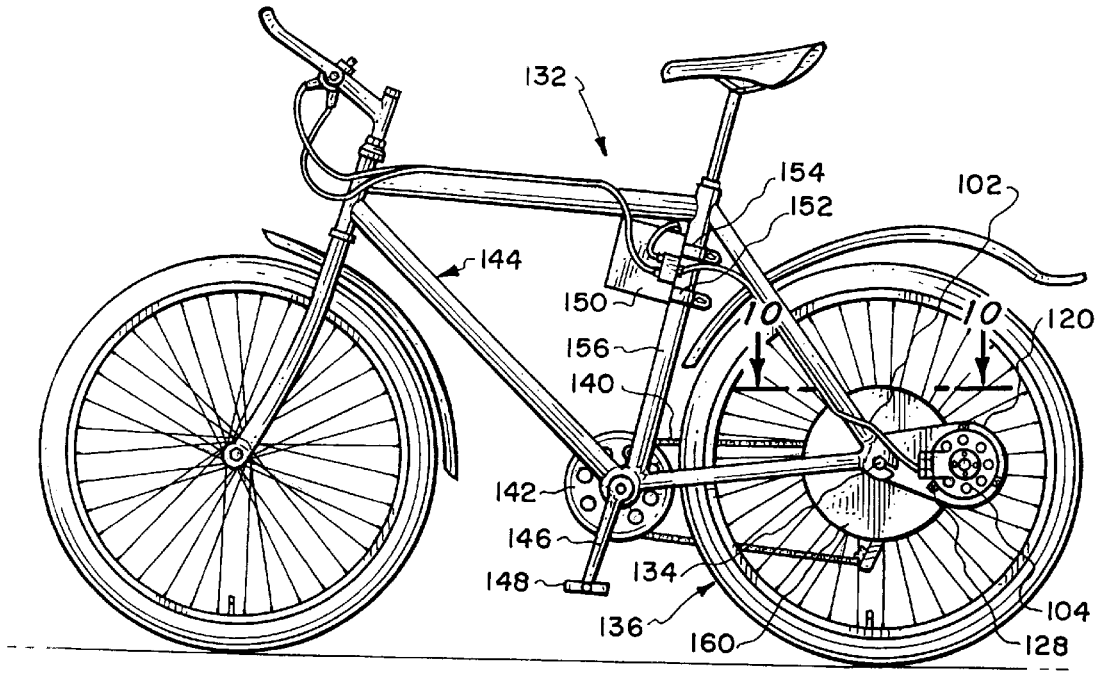
FIG. 9 is a side elevational view of a second type of bicycle upon which has been mounted the power assist apparatus of the present invention which incorporates a belt drive arrangement.
Figure 10:
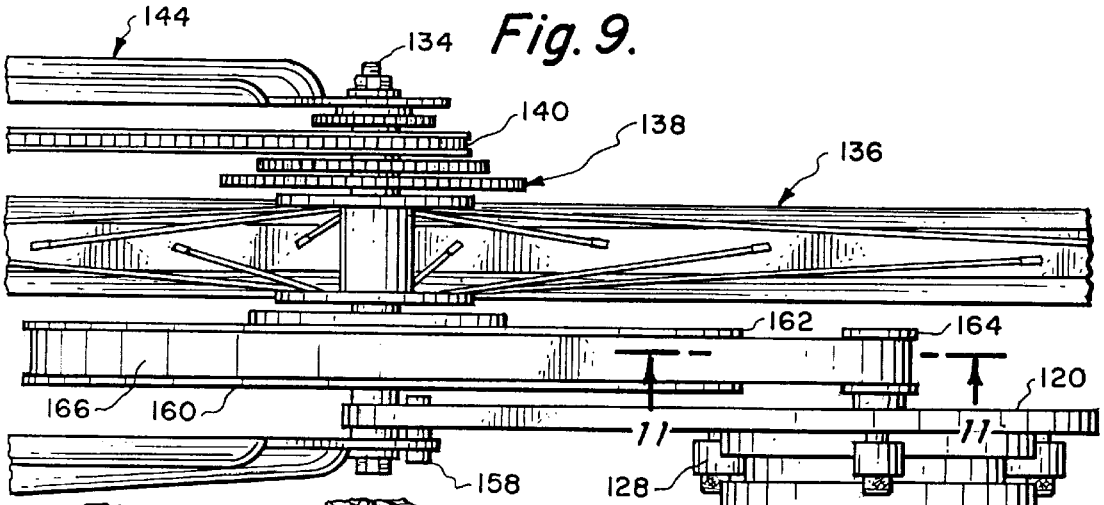
FIG. 10 is a top view of the belt drive power assist apparatus taken along line 10—10 of FIG. 9.
Figure 11:
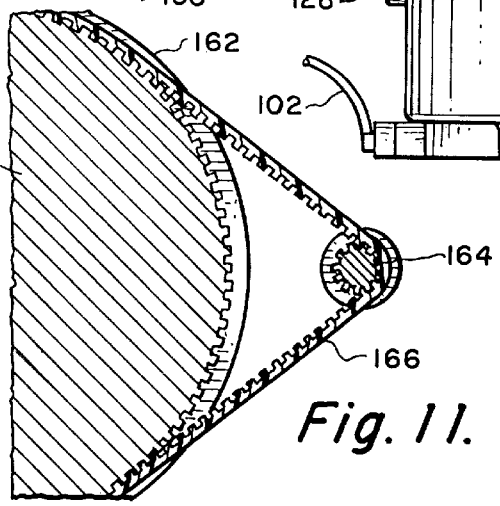
FIG. 11 is a cross-sectional view showing in more detail the belt drive arrangement between the motor and the driven gear taken along line 11—11 of FIG. 10.

Referring particularly to FIGS. 9 and 11, there is shown a second type of bicycle 132 upon which has been mounted the power assist apparatus of this invention. The power assist apparatus includes the same motor housing 104 mounted by a plurality of locking tabs 128 on a mounting plate 120. The mounting plate 120 is pivotally mounted on the axle 134 of the rear wheel 136 of the bicycle 132. The bicycle 132 includes a derailleur 138 which is mounted on the rear wheel 136. The derailleur 138 is to connect with the chain 140 which in turn connects with the chain wheel 142. The chain wheel 142 is mounted on the frame 144 of the bicycle 132. Connecting with the chain wheel 142 are cranks 146 which are to be rotated manually by means of pedals 148. It is to be noted that the bicycle 132 is what is termed a conventional "mountain bike." The bicycle 132 is of different configuration than the bicycle 10.

The motor mounted within the motor housing 104 is electrically operated by means of a battery (not shown) mounted within the battery case 150. The battery case 150 is mounted by straps 152 and 154 on the seat tube 156 of the bicycle frame 144.

The mounting plate 120 is fixedly secured to the frame 144 by means of a bolt or pin fastener 158. Any desired position of the motor housing 104 can be obtained as long as the motor housing 104 does not interfere with any portion of the frame 144. Instead of the driven gear 110 there is substituted a driven pulley 160 mounted about a clutch (not shown). This clutch is mounted on clutch plate 162. The clutch plate 162 is fixedly mounted onto the axle 134. The clutch plate 162 connects together in rotative movement the driven pulley 160 and the rear wheel 136 when the driven pulley 160 is being rotated at the same speed (rpm) as the rear wheel 136. However, as was previously discussed, when the rotation of the rear wheel 136 is at a greater rpm than the driven pulley 160, the clutch will permit the rear wheel 136 to rotate freely relative to the driven pulley 160.

Extending from the motor mounted within the motor housing 104 is a drive pulley 164. The drive pulley 164 is substituted for the drive pinion gear 108. It is to be noted that the drive pulley 164 is not directly engaged with the driven pulley 160 with the drive pulley 164 being spaced apart from the driven pulley 160. However, the rotative torque from the motor contained within the motor housing 104 is transmitted to the driven pulley 160 by means of a drive belt 166 which connects between the drive pulley 164 and the driven pulley 160.

It is again to be emphasized that even when the rear wheel 136 is removed from the bicycle 132, and upon replacement of the rear wheel 136 on the bicycle 132, the precise identical driving arrangement is maintained between the motor mounted within the motor housing 104 and the wheel axle 134. This indexing of the motor to the axle 134 is achieved by the rotational axis of the drive pulley gear 164 being located precisely parallel to the rotational axis of the axle 134. However, additionally even if the motor housing 104 is removed from the mounting plate 120 which would disengage the drive pulley 164 from the belt 166, upon reengagement of the motor housing 104 with the mounting plate 120, the drive pulley 164, when reengaged with the belt 166, will again locate the rotational axis of the drive pulley 164 precisely parallel to the axle 134.

Figure 12:
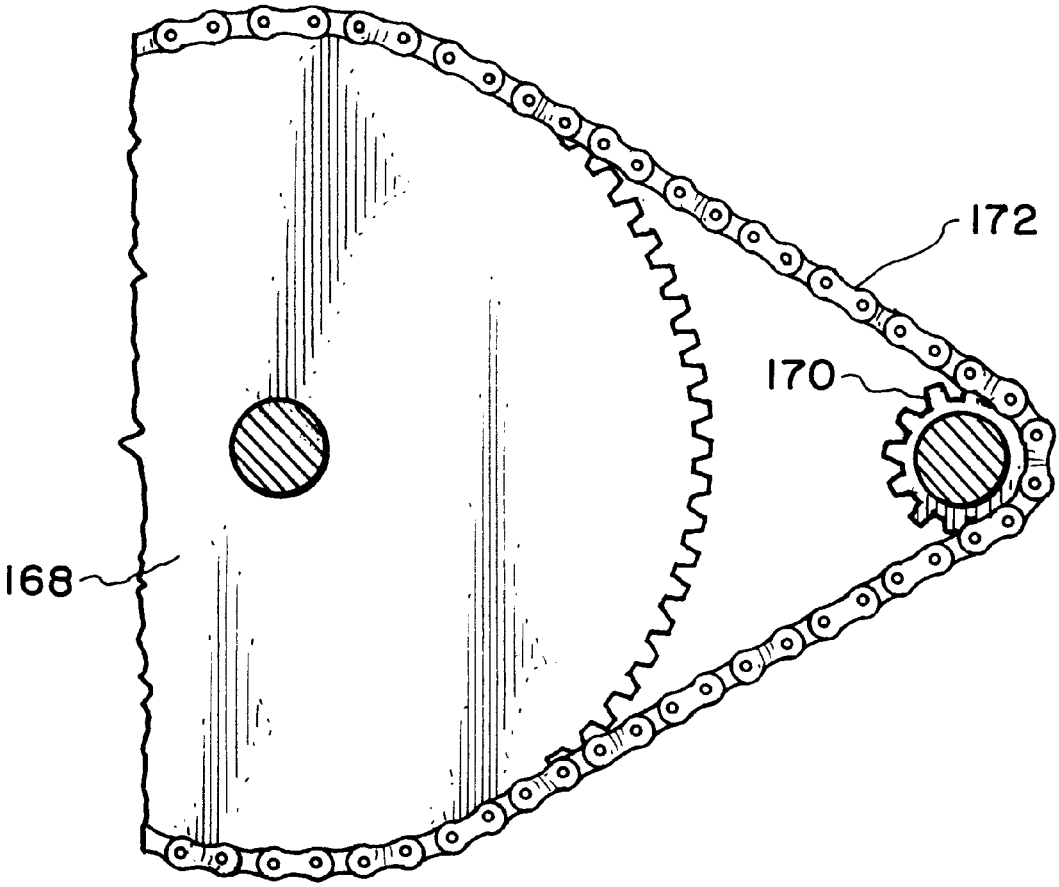
FIG. 12 is a cross-sectional view of a chain and sprocket arrangement that could be used instead of the belt drive arrangement shown in FIG. 11.

Referring particularly to FIG. 12, there is shown a driven sprocket 168 and a drive sprocket 170. A chain 172 could be used to connect between the drive sprocket 170 and the driven sprocket 168. The driven sprocket 168 would be used instead of the driven pulley 160 or the driven gear 110. The drive sprocket 170, which connects to the motor (not shown), is to be substituted for the drive pulley 164 or the drive pinion gear 108.

What is claimed is:

1. In combination with a [bicycle] *wheeled vehicle*, said [bicycle] *wheeled vehicle* having a frame mounted on at least one support wheel, said support wheel being rotatable within a plane of rotation, said support wheel having an axle with said axle being mounted on said frame, said axle having a first axis of rotation which is perpendicular to said plane of rotation, a power assist apparatus to be mounted in conjunction with said [bicycle] *wheeled vehicle*, said power assist apparatus comprising:

a driven gear mounted on said support wheel, said driven gear defining a rotational plane, said rotational plane being parallel to said plane of rotation, said driven gear having a center point, said center point coinciding with said first axis of rotation;

a motor assembly having an output shaft, said motor assembly being mounted on a mounting plate, said mounting plate being supportingly mounted on said axle, said axle being freely rotatable relative to said mounting plate, said mounting plate being fixed by securing means to said frame, said output shaft having a second axis of rotation, a drive gear mounted on said output shaft, said drive gear being in engagement with said driven gear, said drive gear being indexed to said axle by said second axis of rotation being parallel and spaced from said first axis of rotation, said motor assembly being electrically operated to rotate said drive gear and hence said driven gear which produces a power assist to rotate said support wheel; and said mounting plate being pivotally adjustable to various angular positions about said first axis of rotation prior to being affixed to said frame by said securing means to one of said angular positions.

2. The combination as defined in claim 1 wherein:

said driven gear comprising an external gear.

3. The combination as defined in claim 1 wherein:

said securing means comprising a fastener, said fastener being removably mounted on said frame permitting said support wheel and said motor assembly to be disengaged from said [bicycle] *wheeled vehicle*.

4. The combination as defined in claim 1 wherein:

a battery pack which is to provide electrical power to operate said motor assembly, said battery pack being mounted on said frame, said battery pack being removable from said frame, whereby removing of said battery pack and disengaging of said motor assembly from said mounting plate reduces the overall weight of said [bicycle] *wheeled vehicle* permitting said [bicycle] *wheeled vehicle* to be operated as a conventional [bicycle] *wheeled vehicle* not carrying excess weight.

5. The combination as defined in claim 1 wherein:

said drive gear being in direct engagement with said driven gear.

6. In combination with a [bicycle] *wheeled vehicle*, said [bicycle] *wheeled vehicle* having a frame mounted on at least one support wheel, said support wheel being rotatable within a plane of rotation, said support wheel having an axle with said axle being mounted on said frame, said axle having a first axis of rotation which is perpendicular to said plane of rotation, a power assist apparatus to be mounted in conjunction with said [bicycle] *wheeled vehicle*, said power assist apparatus comprising:

a driven gear mounted on said support wheel, said driven gear defining a rotational plane, said rotational plane being parallel to said plane of rotation, said driven gear having a center point, said center point coinciding with said first axis of rotation;

a motor assembly having an output shaft, said motor assembly being mounted on a mounting plate, said mounting plate being supportingly mounted on said axle, said axle being freely rotatable relative to said mounting plate, said mounting plate being fixed by securing means to said frame, said output shaft having a second axis of rotation, a drive gear mounted on said output shaft, said drive gear being in engagement with said driven gear, said drive gear being indexed to said axle by said second axis of rotation being parallel and spaced from said first axis of rotation, said motor assembly being electrically operated to rotate said drive gear and hence said driven gear which produces a power assist to rotate said support wheel; and said mounting plate including an enlarged hole, said motor assembly including a motor housing, said motor housing being mounted within said enlarged hole in a close fitting relationship, a plurality of locking tabs mounted on said mounting plate, each said locking tab being separately movable between a locking position and an unlocking position, said locking position locking said motor housing on said mounting plate, said unlocking position permitting disengagement of said motor housing from said mounting plate.

7. The combination as defined in claim 6 wherein:

a battery pack which is to provide electrical power to operate said motor assembly, said battery pack being mounted on said frame, said battery pack being removable from said frame, whereby removing of said battery pack and disengaging of said motor housing from said mounting plate reduces the overall weight of said [bicycle] *wheeled vehicle* permitting said [bicycle] *wheeled vehicle* to be operated as a conventional [bicycle] *wheeled vehicle* not carrying excess weight.

8. In combination with a [bicycle] *wheeled vehicle*, said [bicycle] *wheeled vehicle* having two in number of support wheels with a frame interconnecting said support wheels, each said support wheel being mounted on an axle with there being a separate said axle for each said support wheel, a power assist apparatus to be mounted in conjunction with one said support wheel, said axle of said one said support wheel being mounted upon said [bicycle] *wheeled vehicle* frame, said one said support wheel having a plane of rotation, said axle of said one said support wheel having a first axis of rotation which is perpendicular to said plane of rotation, said power assist apparatus comprising:

driven means mounted on said support wheel, said driven means having a center point, said center point coinciding with said first axis of rotation, said driven means being rotatable about said center point; and a motor assembly having an output shaft, said motor assembly being mounted on a mounting plate, said mounting plate being supportingly mounted on said axle, said axle being freely rotatable relative to said mounting plate, said mounting plate being pivotally adjustable about said first axis of rotation to various angular positions defining several different mounting positions on said frame prior to being fixed by securing means to said frame to one of said angular positions, said output shaft having a second axis of rotation, a drive means mounted on said output shaft, said drive means being in engagement with said driven means, said drive means being indexed to said axle of said one said support wheel by said second axis of rotation which is parallel and spaced from said first axis of rotation, said motor assembly being electrically operated to rotate said drive means and hence said driven means which produces a power assist to rotate said one support wheel.

9. The combination as defined in claim 8 wherein:

said securing means comprising a fastener, said fastener being removably mounted on said frame permitting said one said support wheel and said motor assembly to be disengaged from said [bicycle] *wheeled vehicle*.

10. The combination as defined in claim 8 wherein:

a battery pack which is to provide electrical power to operate said motor assembly, said battery pack being mounted on said frame, said battery pack being removable from said frame, whereby removing of said battery pack and disengaging of said motor assembly from said mounting plate reduces the overall weight of said [bicycle] *wheeled vehicle* permitting said [bicycle] *wheeled vehicle* to be operated as a conventional [bicycle] *wheeled vehicle* not carrying excess weight.

11. The combination as defined in claim 8 wherein:

said securing means comprising a fastener, said fastener being removably mounted on said frame permitting said support wheel and said motor assembly to be disengaged from said [bicycle] *wheeled vehicle*.

12. The combination as defined in claim 8 wherein:

said driven means comprising a driven pulley, said drive means comprising a drive pulley, a drive belt interconnecting said drive pulley and said driven pulley.

13. The combination as defined in claim 8 wherein:

said driven means comprising a driven sprocket, said drive means comprising a drive sprocket, a chain interconnecting said drive sprocket and said driven sprocket.

14. In combination with a [bicycle] *wheeled vehicle*, said [bicycle] *wheeled vehicle* having two in number of support wheels with a frame interconnecting said support wheels, each said support wheel being mounted on an axle with there being a separate said axle for each said support wheel, a power assist apparatus to be mounted in conjunction with one said support wheel, said axle of said one said support wheel being mounted upon said [bicycle] *wheeled vehicle* frame, said one said support wheel having a plane of rotation, said axle of said one said support wheel having a first axis of rotation which is perpendicular to said plane of rotation, said power assist apparatus comprising:

driven means mounted on said support wheel, said driven means having a center point, said center point coinciding with said first axis of rotation, said driven means being rotatable about said center point;

a motor assembly having an output shaft, said motor assembly being mounted on a mounting plate, said mounting plate being supportingly mounted on said axle, said axle being freely rotatable relative to said mounting plate, said mounting plate being fixed by securing means to said frame, said output shaft having a second axis of rotation, a drive gear mounted on said output shaft, said drive gear being in engagement with said driven gear, said drive gear being indexed to said axle by said second axis of rotation being parallel and spaced from said first axis of rotation, said motor assembly being electrically operated to rotate said drive gear and hence said driven gear which produces a power assist to rotate said support wheel; and said mounting plate including an enlarged hole, said motor assembly including a motor housing, said motor housing being mounted within said enlarged hole in a close fitting relationship, a plurality of locking tabs mounted on said mounting plate, each said locking tab being separately movable between a locking position and an unlocking position, said locking position locking said motor housing on said mounting plate, said unlocking position permitting quick disengagement and quick reengagement of said motor housing from said mounting plate.

* * * * *